United States Patent [19]
Topper

[11] 3,996,793
[45] Dec. 14, 1976

[54] PRESSURE CONTROL TEST APPARATUS

[76] Inventor: Robert Topper, 103 Buckingham Ave., Trenton, N.J. 08618

[22] Filed: Apr. 5, 1976

[21] Appl. No.: 673,774

[52] U.S. Cl. .............................................. 73/117.1
[51] Int. Cl.² ...................................... G01M 15/00
[58] Field of Search ................. 73/117.1, 116, 147

[56] References Cited
UNITED STATES PATENTS

| | | | |
|---|---|---|---|
| 2,357,625 | 9/1944 | Armbruster | 73/117.1 |
| 2,615,331 | 10/1952 | Lundgren | 73/117.1 |

FOREIGN PATENTS OR APPLICATIONS

| | | | |
|---|---|---|---|
| 265,513 | 3/1970 | U.S.S.R. | 73/117.1 |

Primary Examiner—Jerry W. Myracle
Attorney, Agent, or Firm—Sperry and Zoda

[57] ABSTRACT

A pressure control test apparatus which provides a simulation of various ambient operating conditions to a test unit such as an internal combustion engine and the like, the apparatus including a plenum chamber having air therein under closely controlled temperature and pressure limits, an intake blower for supplying air into said plenum chamber and an intake valve operable to modulate flow of air between the intake blower and the plenum chamber, an exhaust blower operative to exhaust gas from the plenum chamber and an exhaust valve positioned between the exhaust blower and the plenum chamber operable to modulate flow of gas therebetween, the plenum chamber further defining an inlet and an outlet, the inlet being connected to an intake conduit to supply air to the air intake of a test unit and the outlet communicating with an exhaust conduit for receiving exhausted gas from the test unit and returning same to the plenum chamber, also further including an exhaust gas cooler positioned within the exhaust conduit for cooling the temperature of exhausted gas from the test unit down to approximately the temperature of the air traveling through the intake conduit, the exhaust cooling system further including a temperature sensing means such as a thermocouple or the like positioned adjacent the outlet in the exhaust conduit to sense gas temperature therein, the temperature sensing means communicating to an exhaust gas temperature control means which modulates a fluid regulating valve for controlling the amount of cooling fluid passing through the exhaust gas cooler and thereby controlling the cooling of the exhausted gas passing through the exhaust conduit, the apparatus further including an air valve control means adapted to be responsive to the air pressure within the intake conduit to control the modulating characteristics of the intake and exhaust valves of the plenum chamber.

16 Claims, 1 Drawing Figure

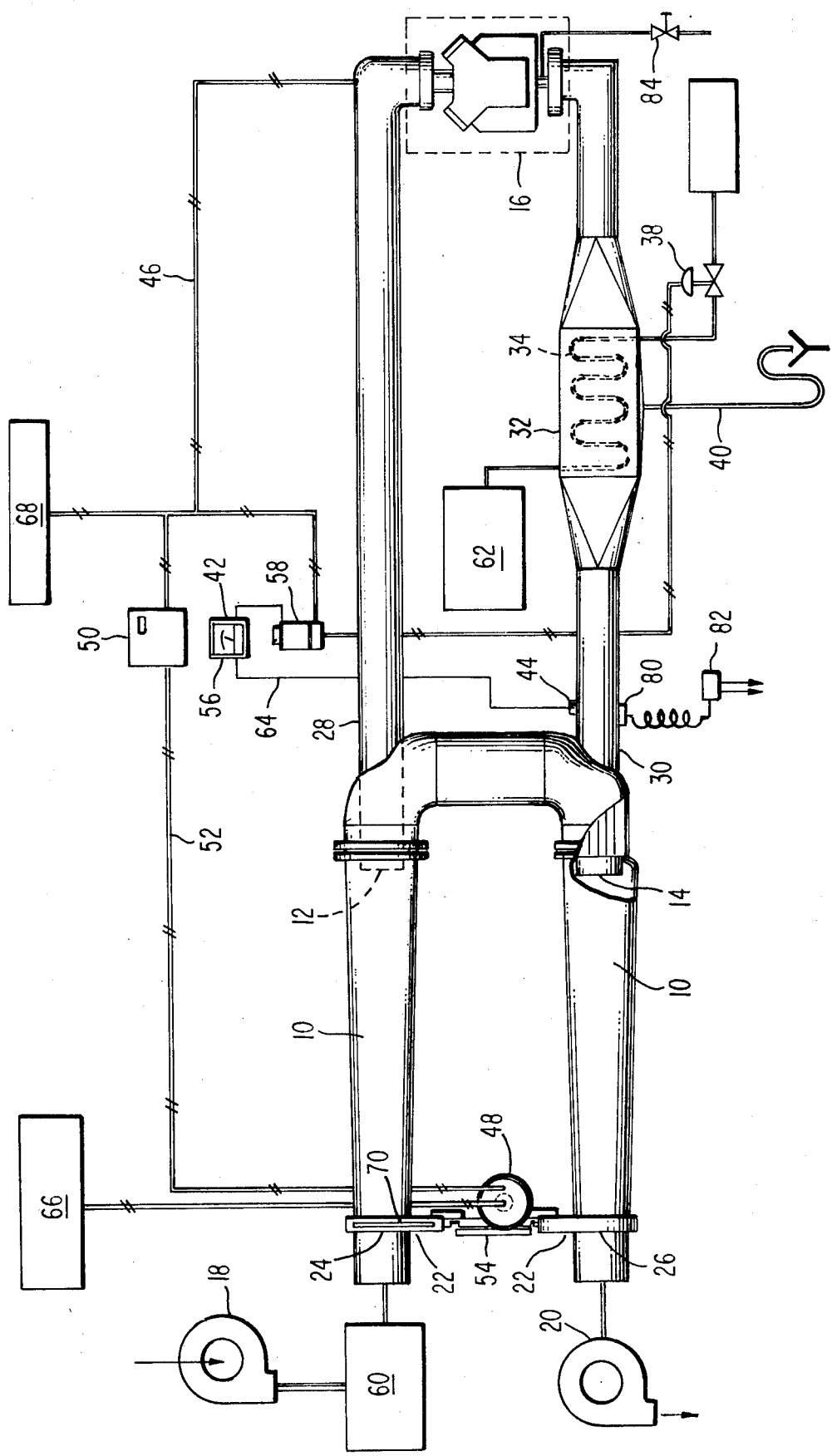

PRESSURE CONTROL TEST APPARATUS

BACKGROUND OF THE INVENTION

1. Field of the Invention

The present invention pertains to the field of testing apparatus which provides a simulation of the atmospheric pressure conditions at any selected altitude. While the present invention is designed particularly for the similation of high altitude ambient pressures, the apparatus may also be used for simulating pressures than ambient.

This field of design has become very important recently due to the regulations of various government agencies upon the operating conditions and emissions of automotive internal combustion engines. For example, The Environmental Protection Agency has devised a group of tests under which an internal combustion engine must be certified in order to allow sale thereof. Some of these tests must be performed at high altitude locations such as Denver and other cities located well above sea level. In order to simulate the conditions existing at such high altitude locations, the automotive manufacturers have an immediate need for a simulation device which will provide the characteristics of high altitude operation of a internal combustion engine at the presently existing test locations throughout the United States.

2. Description of the Prior Art

Throughout the last couple of decades, many engine testing devices have been designed to simulate conditions at the various altitudes at which the engines will be operated. These testing devices were designed primarily for use with aeronautical equipment since aircraft engines were the sole concern at that time. Also, the prior art designs were primarily concerned with power and acceleration rather than efficiency and emissions control. Examples of such patents are U.S. Pat. No. 2,357,625 and 2,615,331.

Another pertinent prior art U.S. Pat. No. 1,503,307 issued to Durr on a motor testing chamber. The Durr patent is an example of an early design for simulating ambient pressures at values less than sea level atmospheric pressure. The design utilizes a closed chamber with a single exhausting fan. The exhausting fan is arranged to primarily exhaust from the exhaust manifold of the internal combustion engine and secondarily to selectively draw additional air from the simulated atmosphere within the chamber. The chamber includes an inlet port for admitting air within the chamber which is controlled by a reducing valve therein for limiting passage of air into the chamber. In this manner, pressures may be simulated at values lower than sea level atmospheric pressure. The present invention distinguishes over the Durr patent since Durr throttles upstream only and uses only an exhaust blower while the present invention includes an intake blower and an exhaust blower and throttles at the intake and at the exhaust from the chamber. The Durr design does not cool the exhaust gases returning to the atmosphere within the chamber and therefore does not maintain a constant mass flow. Also the Durr patent does not have a feed back control for maintaining the desired atmospheric conditions under transient operating conditions. Also the Durr design requires the location of the test unit or engine within the simulated environment chamber whereas the present invention allows remote location of the test unit. These and further advantages will be described below.

SUMMARY OF THE INVENTION

The present invention may include a plenum chamber in which the predetermined desired operating conditions are simulated for exposure to a unit to be tested. In particular, the plenum chamber should have a closely controlled volume and mass of air therein which is maintained at a closely controlled air pressure. The simulated atmospheric conditions within the plenum chamber will be controlled by an intake blower for admitting air into the plenum chamber and by an exhaust blower for exhausting air from the plenum chamber. Maintenance of the varying pressure conditions and mass flow conditions can be controlled by valve means which may be positioned between the blowers and the plenum chamber.

The plenum chamber may include an inlet for communicating air to an intake conduit for passage to the air intake of the test unit. Similarly, the outlet may be connected to an exhaust conduit for receiving exhausted gases from the test unit. Preferably, the outlet is located within the plenum chamber at a location closer to the exhaust blower than the location of the inlet. In this manner, gases exhausted from the test unit will not be recycled through the intake conduit.

To maintain the desired simulated conditions within the plenum chamber during transient operating conditions of the test unit, an exhaust gas cooler may be positioned within the exhaust conduit to cool the gases exhausted from the test unit down to a temperature approximately equal to the temperature of the gas of the air passing through the intake conduit to the test unit. The exhaust gas cooler may include a cooling element such as a finned core design through which cooling water passes and over which the hot exhaust gases shall pass. In this manner by controlling the amount of water or other cooling fluid passing through the cooling element, the temperature of the exhausted gases passing through the outlet into the plenum chamber may be very closely controlled. To facilitate this control, a temperature sensing means such as a thermocouple device may be positioned adjacent the outlet to sense the temperature of gases as they are exhausted into the plenum chamber. The thermocouple device may be connected to a exhaust gas temperature control means which is operable to control the position of a fluid regulating valve which maintains the desired flow of cooling fluid through the cooling element of the exhaust gas cooler. In this manner, a full temperature feedback system will be achieved to maintain the desired exhaust gas temperature at the outlet.

The present invention may also include an air valve control means which is operable to control the positioning of the air valve means located between the blowers and the plenum chamber. The air valve control means may be connected to a feedback line to sense the absolute pressure within the intake conduit and in response thereto will vary the position of the air valve means by control of a pneumatic positioner. Preferably the air valve means will comprise segmented orifice valves in order to maintain a constant mass flow through the plenum chamber while also maintaining a constant pressure therein. It should also be appreciated that the present apparatus may include a programmed design for simulating a change in altitude by varying the simulated ambient pressure within the plenum chamber.

It is an object of the present invention to provide a pressure control test apparatus usable with an internal combustion engine for maintaining simulated ambient atmospheric conditions during transient engine operating conditions.

It is an object of the present invention to provide a pressure control test apparatus for simulating ambient conditions operable to maintain constant flow therethrough.

It is an object of the present invention to provide an apparatus for exposing a test unit to desired operating conditions while the test unit is not located within the chamber simulating the atmospheric conditions.

It is an object of the present invention to provide a test apparatus operable to cool gases exhausted from a test unit to the same temperature as air supplied to the intake of the test unit.

It is an object of the present invention to provide a pressure control test apparatus which includes an air valve control means with a feedback line for sensing the conditions within the simulated environment to maintain close control of intake and exhaust from same environment.

It is an object of the present invention to provide a pressure control test apparatus for simulating atmospheric conditions at pressures greater and less than normal sea level ambient pressure.

It is an object of the present invention to provide a pressure control test apparatus for cooling the exhaust gases, removing condensate therefrom, and returning the exhausted gases to the environment at a temperature slightly greater than the temperature of the air withdrawn from the environment in order to maintain a constant pressure when considering the withdrawing of the mass of the condensed liquid.

It is an object of the present invention to provide a simulated environment for use with a test unit in which the gases flowing through the outlet from a test unit are communicated directly to the exhaust valve and blower in order to prevent recycling of the exhausted gases through the intake of the test unit.

BRIEF DESCRIPTION OF THE DRAWING

While the invention is particularly pointed out and distinctly claimed in the concluding portions herein, a preferred embodiment is set forth in the following detailed description which may be best understood when read in connection with the accompanying drawing, in which:

The FIGURE is a schematic illustration of an embodiment of a pressure control test apparatus.

DETAILED DESCRIPTION OF THE PREFERRED EMBODIMENT

In an embodiment of the present invention as shown in the above FIGURE a plenum chamber 10 may be formed in any convenient configuration to include an inlet 12 and an outlet 14. The inlet 12 is designed to communicate to a test unit 16 through an intake conduit 28. The intake conduit 28 will supply air from the simulated environment within the plenum chamber to the test unit 16. Similarly an exhaust conduit 30 will be connected to the test unit to receive exhausted gases therefrom. The exhaust conduit 30 will be connected to the outlet 14 to expel the exhausted gases from test unit 16 into the plenum chamber 10.

To maintain the desired environmental characteristics such as constant air mass flow and air pressure within the plenum chamber 10, an intake blower 18 and an exhaust blower 20 will be positioned adjacent the plenum chamber 10. To control the flow of air between the plenum chamber and the blowers 18 and 20 an air valve means 22 will be positioned therebetween. The air valve means may preferably be configured having an intake valve 24 positioned between chamber 10 and intake blower 18. Similarly an exhaust valve 26 may be located between chamber 10 and exhaust blower 20. Additionally an air supply 60 may be conveniently positioned near intake blower 18 in order to provide a source of air under controlled conditions thereto. By cooperative movement between the intake valve 24 and the exhaust valve 26 the simulated atmospheric conditions within the plenum chamber may be accurately maintained. In particular if the intake blower is chosen to supply air at a pressure of 2 inches Hg greater than normal atmospheric pressure and if the exhaust blower is chosen to exhaust gases to a pressure of −6 inches Hg then a pressure drop of 8 inches Hg will exist across the plenum chamber 10 and air valve means 22. At a constant flow of 500 cubic feet per minute the simulated pressure conditions within the plenum chamber 10 may be maintained at any value between +2 inches Hg and −6 inches Hg. With such a configuration the absolute value of pressure created within the chamber 10 will be dependant upon the relative positioning of the intake valve 24 and the exhaust valve 26. Generally speaking, if the intake valve 24 is in a mostly opened position and the exhaust valve 26 is in a mostly closed position the absolute value of the pressure within the chamber 10 will approach the higher limit of +2 inches Hg. On the other hand if the intake valve tends toward the closed position and the exhaust valve tends toward the open position the pressure within the plenum chamber 10 will decrease to a value closer to the lower limit of −6 inches Hg. It therefore should be appreciated that cooperative action between the intake valve and the exhaust valve is a preferable aspect of the present invention.

In order to maintain a constant mass flow through the chamber 10 of the present invention an exhaust gas cooler 32 may be positioned within the exhaust conduit to cool the gases exhausted from the test unit 16 prior to being expelled into the atmosphere of the chamber 10 through the outlet 14. To achieve this cooling a cooling element 34 in the form of a water-filled fin design similar to a radiator core may be positioned within the exhaust conduit 30 such that hot exhausted gases must pass through the cooling element and thereby have the temperature thereof lowered. Any desirable cooling fluid may be chosen to flow through the cooling element such as water or the like. The use of such a core design will require the presence of a cooling fluid supply 62 for providing cooling fluid to the cooling element 34 at a relatively low temperature. To control the amount of cooling fluid flowing through the exhaust gas within the cooling fluid lines of the exhaust cooler. To control the fluid regulating valve an exhaust gas temperature control means 42 such as an indicating controller 56 may be connected to the cooling fluid regulating valve 38. This control system may include a temperature sensing element 44 such as a thermocouple device which is positioned to sense the temperature of exhausted gases passing into the plenum chamber 10 through the outlet 14. The temperature sensing element 44 may be operatively connected to the indicating controller 56 to communicate thereto the temperature reading of the gases being exhausted into the plenum chamber. With the use of a thermocouple temperature sensing device the means of communication will be a thermocouple electrical line 64. The indicating controller will convey the reading to a current-to-pneumatic transducer 58 which will convert the 4 to 20 milliampere signal from the thermocouple into a 3 to 15 pounds per square inch pneumatic signal for conveyance to the fluid regulating valve 38. In this manner the fluid regulating valve will receive an input which will supply information as to whether sufficient cooling of the exhausted gases from the test unit 16 exists. If the temperature of the gases being expelled into the chamber 10 is too high then the fluid regulating valve 38 will open to allow increased flow of cooling fluid from the cooling fluid supply 62 through the cooling element 34 to further decrease the temperature of gases passing from the exhaust gas cooler 32 to the outlet 14. Preferably the exhaust gas cooler 32 may include a drain means 40 which may be usable to collect condensate from the exhausted gases when cooled.

To facilitate the control of pressures within the plenum chamber 10 and the pressure of air supplied through the intake conduit 28 to the test unit 16, an air valve control means 50 may be operable responsive to the absolute value of the pressure within the intake conduit 28 to control the relative positioning of the intake valve 24 and the exhaust valve 26. To communicate the pressure reading in the intake conduit 28 to the air valve control means 50, a feedback line 46 may be operatively connected between conduit 28 and control means 22. Responsive to the air pressure communicated by feedback line 46 the air valve control means 22 may be adapted to control a pneumatic positioner 48 located adjacent the intake and exhaust valves for accurate control thereof. Air valve control means 22 may be operatively connected to the pneumatic positioner 48 through an air valve control line 52. To achieve cooperative movement between the intake and exhaust valves a cam means 54 may be positioned therebetween and be operable responsive to actuation by the pneumatic positioner 48. To achieve further accurate control the intake valve 24 and the exhaust valve 26 may be chosen as segmented orifice valves. In this manner accurate control of constant mass flow and pressure within the plenum chamber 10 will be facilitated.

As an example of operation of the pressure control test apparatus of the present invention, intake blower 18 will expel air from air supply 60 through the intake valve 24 into plenum chamber 10, while at the same time exhaust blower 20 will be withdrawing gas from the plenum chamber 10. The positioning of intake valve 24 and exhaust valve 26 will cooperate to create the desired pressure and mass flow within the plenum chamber 10. Inlet 12 is positioned within the plenum chamber to receive fresh air from intake valve 24 for supplying this fresh air through intake conduit 28 to the air intake of the test unit 16. While a portion of the fresh air enters the inlet 12 the remainder of fresh air passes through the plenum chamber 10 toward the outlet 14 and on through the exhaust valve 26. The amount of air which passes from the intake valve to the exhaust valve without passing through the test unit 16 is dependant upon the operating conditions of the test unit. When the test unit is an internal combustion engine, during high speed operation a larger mass flow of air through the test unit will occur whereas at low speed operation more of the fresh air will pass directly from the intake valve to the exhaust valve without passing through the test unit. It is this flexibility in the flow of a constant total mass of air which allows the pressure conditions within the plenum chamber to be maintained during transient operating conditions of the test unit.

In order to maintain the constant mass flow the mass of air passing through the intake conduit into the test unit must equal the mass of air flowing from the exhaust conduit into the plenum chamber. To maintain the atmospheric conditions within the plenum chamber 10 the heat injected into the air which passes through the test unit must be withdrawn to keep the temperature of gas flowing out the outlet equal to the temperature of gas flowing in the inlet. To achieve this purpose the exhaust gas cooler 32 is positioned in the exhaust conduit. Since the temperature of exhaust gases emitted from a test unit which may include a catalytic converter may be as high as 1100° F, the cooling of these exhaust gases is extremely important. Also since such a large temperature decrease is required, a substantial amount of condensation during this cooling action may occur. A drain means 40 may be included in the exhaust gas cooler which can be adapted to collect this condensate. This condensation will comprise a slight mass decrease in the total mass flow between the intake and exhaust valves. To compensate for this decrease in mass, the exhaust gas cooler 32 and the fluid regulating valve 38 may be preset to allow the exhaust gas returning to the plenum chamber 10 through the outlet 14 to be at a slightly higher temperature and therefore the same pressure as the air passing through the inlet into the intake conduit 28. Also it should be noted that the outlet is located closer to the exhaust valve than the inlet so that gases exhausted from the outlet 14 will pass to the exhaust blower 20 and thereby not be recycled with the fresh air passing through intake conduit 28.

The present invention has an inherent advantage of adaptability to various flow volumes. In particular the present invention will most usually be used with a flow volume of approximately 500 cubic feet per minute. However to achieve other flow ratings within a reasonable limit such as 250 cubic feet per minute it is easily made possible merely by a slight variation in the profile chosen for the cam means 54. Accurate control of the cam means is provided by a pneumatic positioner which may operate from a first air pressure source 66 which may have a value of 60 to 100 pounds per square inch in order to closely control the positioning of the intake valve 24 and the exhaust valve 26 by means of pneumatic positioner 48. Similarly a second air pressure source having a generally lower rating of approximately 20 pounds per square inch may be chosen to communicate with the various instruments of the present system to assure accurate operation thereof. For example the second air pressure source 68 may be connected to pneumatic transducer 58 and/or air valve control means 50. Of course, the entire system may be increased proportionally to accommodate a wider range of engine flow rates.

The present invention provides a flexible system for testing under a variety of conditions. In particular, testing of a test unit which must be simulated to change altitudes such that the ambient pressure will vary may be easily achieved with the present system since a simple programming device for varying the positioning of the intake and exhaust valves will create a simulation of change in altitude. Any convenient programming device such as a time driven cam means and the like (not shown) may be used to accomplish this design.

The present invention provides a simple and convenient apparatus which is portable for easy relocation. Most of the prior art systems have created a chamber for simulating various atmospheric conditions in which the test unit must be located. This limitation is not present in the pressure control test apparatus of the present design and therefore the advantages inherent with such a portable system are apparent.

To assure that gases exhausted through outlet 14 will not re-enter the inlet 12, a constant minimum air flow must exist through the plenum chamber 10 from the inlet 12 to the outlet 14. With a system capacity of 500 cubic feet per minute, this minimum may be chosen as approximately 50 to 100 cubic feet per minute and as such the test unit will still be capable of drawing as much as 400 to 450 cubic feet per minute from the inlet 12 without disturbing the plenum chamber sweep of clean air.

To achieve accurate control of the flow of gas between the chamber 10 and the blowers 18 and 20 the intake and exhaust valves may preferably be chosen of a round configuration having a valve slide 70 which is operable to control the operable cross-sectional flow area of each valve. This valve design is merely preferable and in no way is a limitation upon the entire design of the present system.

An emergency switch 82 may be utilized being responsive to a temperature sensing device 80 in the exhaust conduit 30 to terminate operation of the testing device in case of malfunction of the exhaust gas cooler to prevent damage from overheating of the apparatus. Also test valves 84 may be positioned at various locations throughout the apparatus of the present device.

It should be appreciated that the intake conduit and exhaust may also communicate with the crankcase environment and other similar ports of the test unit to expose the entire test unit to the chosen environmental characteristics.

While particular embodiments of this invention have been shown in the drawing and described above, it will be apparent that many changes may be made in the form, arrangement and positioning of the various elements of the combination. In consideration thereof, it should be appreciated that preferred embodiments of this invention disclosed herein are intended to be illustrative only and not intended to limit the scope of the invention.

I claim:

1. A pressure control test apparatus for providing a predetermined simulation of operating conditions to a test unit comprising:
   a. a plenum chamber containing a closely controlled volume and mass flow of air and a closely controlled air pressure therein, said plenum chamber defining an inlet and an outlet for communication of air therein to and from a test unit;
   b. an intake blower and an exhaust blower operatively connected to said plenum chamber to supply air thereto and to withdraw gas therefrom, respectively;
   c. air valve means positioned between said blowers and said plenum chamber to control the amount and pressure of air within said plenum chamber;
   d. an intake conduit extending from said inlet of said plenum chamber to the air intake of a test unit; and
   e. an exhaust conduit extending from the exhaust of a test unit to said outlet in said plenum chamber.

2. The apparatus as defined in claim 1 further comprising an exhaust gas cooler positioned in said exhaust conduit for cooling the temperature of gas exhausted from a test unit prior to returning the exhausted gas into said plenum chamber through said outlet.

3. The apparatus as defined in claim 2 wherein the exhausted gas is cooled by said exhaust gas cooler to a temperature approximately equal to the temperature of air passing through said intake conduit to the air intake of a test unit.

4. The apparatus as defined in claim 2 wherein said exhaust gas cooler includes a cooling element through which a cooling fluid such as water passes to cool the exhaust gas passing thereover.

5. The apparatus as defined in claim 4 wherein said cooling element includes a drain means.

6. The apparatus as defined in claim 4 wherein said exhaust gas cooler includes a fluid regulating valve for controlling the amount of cooling fluid passing through said element to control the temperature of exhaust gas returning to said plenum chamber through said outlet.

7. The apparatus as defined in claim 2 further comrpising:
   a. an exhaust gas temperature control means adapted to control the amount of cooling achieved by said exhaust gas cooler; and
   b. a temperature sensing element positioned adjacent said outlet and connected to communicate the exhaust gas temperature reading to said exhaust gas temperature control means.

8. The apparatus as defined in claim 7 wherein said temperature sensing element is a thermocouple device.

9. The apparatus as defined in claim 1 further comprising:
   a. an air valve control means adapted to control the environmental characteristics within said plenum chamber and said conduits by controlling said air valve means;
   b. an air valve control line connecting said air valve control means and said air valve means; and
   c. a feedback line connected between said intake conduit and said air valve control means to communicate the air pressure reading within said intake conduit to said air valve control means to facilitate control of said air valve means.

10. The apparatus as defined in claim 9 further comprising a pneumatic positioner located between said air valve control line and said air valve means to facilitate accurate control of said air valve means.

11. The apparatus as defined in claim 9 wherein said air valve means further comprises:
   a. an intake valve located between said plenum chamber and said intake blower to modulate air flow therebetween;
   b. an exhaust valve located between said plenum chamber and said exhaust blower to modulate gas flow therebetween; and
   c. cam means secured to said intake and exhaust valves and being responsive to said air valve control means to modulate flow between said plenum chamber and said intake and exhaust blowers.

12. The apparatus as defined in claim 11 wherein said exhaust and intake valves are cooperatively operable together through said cam means.

13. The apparatus as defined in claim 1 wherein said air valve means comprises segmented orifice valves.

14. The apparatus as defined in claim 1 wherein said inlet is positioned within said plenum chamber closer to said intake blower than said outlet and said outlet is positioned within said plenum chamber closer to said exhaust blower than said inlet to prevent any gas expelled from said outlet from entering said inlet and being returned to the test unit through said intake conduit.

15. The apparatus as defined in claim 1 wherein the test unit is positioned outside of said plenum chamber.

16. The pressure control test apparatus for providing a predetermined simulation of operating conditions to a test unit comprising:
 a. a plenum chamber containing a closely controlled volume and mass of air therein and a closely controlled air pressure, said chamber defining an inlet and an outlet to facilitate flow of gases between said chamber and said test unit;
 b. an intake blower and an exhaust blower operatively connected to said plenum chamber to supply air thereto and to withdraw gas therefrom, respectively;
 c. air valve means of a segmented orifice type positioned between said blowers and said plenum chamber to modulate gas flow therein, said valve means including an intake valve between said intake blower and said plenum chamber and an exhaust valve between said plenum chamber and said exhaust blower, said intake and exhaust valves being interconnected for cooperative movement thereof;
 d. an intake conduit extending from said inlet to the air intake of a test unit;
 e. an exhaust conduit extending from the exhaust of a test unit to said outlet, said plenum chamber defining said outlet at a location between said inlet and said exhaust valve to prevent passage of gases from said exhaust conduit through said inlet to return to the test unit;
 f. an exhaust gas cooler positioned within said exhaust conduit, said cooler including a cooling element through which cooling fluid passes and over which exhausted gas must pass and a cooling fluid regulating valve for controlling the amount of cooling fluid passing through said cooling element to control the temperature of exhausted gases passing into said plenum chamber through said outlet;
 g. an exhaust gas temperature control means further comprising:
  a. a thermocouple device positioned in said exhaust conduit between said exhaust cooler and said outlet to sense temperature therein;
  2. an indicating controller connected electrically to said thermocouple device; and
  3. a current-to-pneumatic transducer being electrically connected to said controller and being pneumatically connected to said cooling fluid regulating valve, said cooling fluid regulating valve being responsive to said thermocouple device to modulate cooling fluid flow through said exhaust cooler and to control the temperature of exhausted gas passing through said outlet;
 h. an air valve control means adapted to sense air pressure within said intake conduit and being responsive thereto to control simulated conditions within said plenum chamber by controlling said intake and exhaust valves; and
 i. a pneumatic positioner and a cam means located between said air valve control means and said intake and exhaust valves to facilitate accurate control thereof.

* * * * *